…

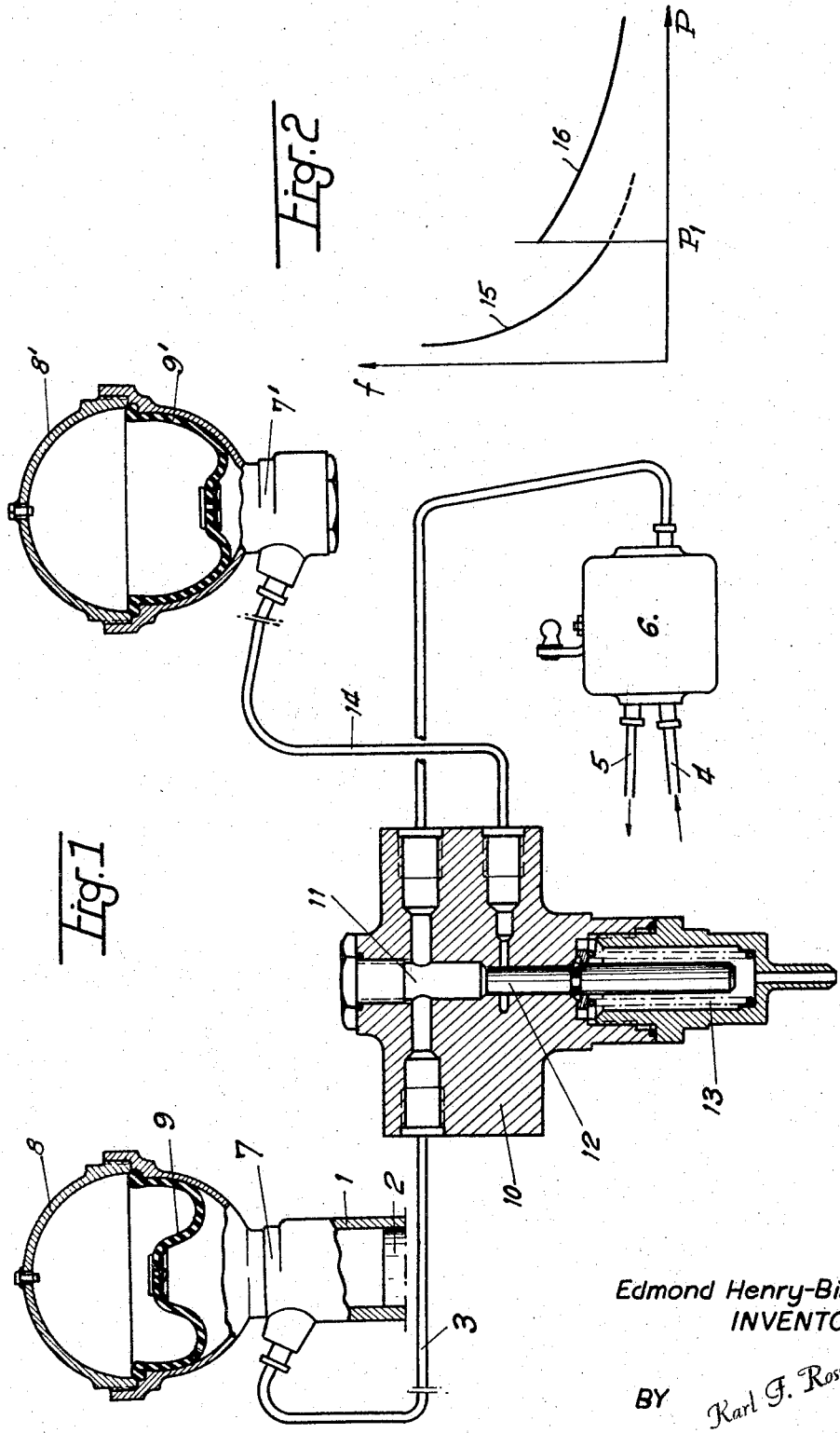

United States Patent Office 3,353,815
Patented Nov. 21, 1967

3,353,815
HYDRO-PNEUMATIC SUSPENSIONS
Edmond Henry-Biabaud, Paris, France, assignor to Societe Anonyme Andre Citroen, Paris, France, a French company
Filed Nov. 1, 1965, Ser. No. 505,800
Claims priority, application France, Nov. 16, 1964, 995,057
6 Claims. (Cl. 267—64)

The present invention relates to a hydro-pneumatic suspension.

The flexibility of a hydro-pneumatic suspension is proportional to the volume of the enclosure and inversely proportional to the square of the load carried. As the result, when the variation of load is large, for example in the case of the rear axle of a utility vehicle, the flexibility varies considerably. In order that the flexibility under load should have a correct value, it is necessary that the volume of the enclosure should be large and therefore the flexibility without load becomes excessive.

The invention has for its object an improved hydropneumatic suspension constructed in such a manner as to overcome these difficulties, because it has a flexibility which varies relatively little with the load and requires only an enclosure of reduced volume to enable the flexibilty under load to have a correct value.

According to the invention there is provided a hydropneumatic vehicle suspension, a liquid-containing cylinder for connection to one member of a vehicle, a piston slidable in said cylinder for connection to another member of a vehicle said one member being movable relatively to the other member, a first gas-containing chamber communicating with the cylinder, a movable separator interposed between the liquid in the cylinder and the gas in the chamber, a second gas-containing chamber, and means for placing the cylinder in communication with the second chamber above a predetermined load on the vehicle whereby the resiliency of the suspension can be modified.

One embodiment of a hydro-pneumatic suspension in accordance with the invention will now be described, by way of example, with reference to the accompanying diagrammatic drawing in which:

FIGURE 1 is a diagram of the suspension; and
FIGURE 2 shows the variation in the flexibility as a function of the load on the suspension.

The suspension illustrated in FIGURE 1 comprises a cylinder 1 in which there is mounted a piston 2, one of these elements being connected to a fixed member and the other to a movable member; these members may be, for example, the rear axle of an automobile vehicle and the chassis of the vehicle. The cylinder 1 communicates through a pipe 3 with a liquid source; in the example shown, the pipe 3 communicates with an inlet pipe 4 for liquid under pressure and with a return pipe 5, through a height controller 6, the latter acting in known manner, to maintain substantially constant the relative positions of the movable member and fixed member, whilst allowing a certain volume of liquid to pass through the pipe 4 to the pipe 3 when the piston 2 falls in the cylinder 1 and allows it, on the contrary to pass a certain volume of liquid from the pipe 3 to the return pipe 5 when the piston tends to rise in its cylinder.

The cylinder 1 is connected through a damper 7 to an enclosure 8 which contains gas under pressure, this gas being separated from the liquid by a flexible membrane 9.

The cylinder 1 is, moreover, connected through a damper 7' to an enclosure 8' which contains a gas under pressure separated from the liquid by a membrane 9'.

A control valve 10 is interposed between the cylinder 1 and the enclosure 8'. This control valve includes a body in which there is provided a chamber 11 in communication with the cylinder 1 and with the height controller 6. A piston 12 is slidably mounted in this chamber against the action of the spring 13 the stiffness of which is preferably adjustable. In its rest position, the piston 12 is held by the spring 13 in a position in which it blocks a port of a pipe 14 communicating with the enclosure 8'; when the pressure in the chamber 11 reaches a certain value, the piston 12 is sufficiently depressed to open the port of the pipe 14 so that the enclosure 8' communicates with the cylinder 1.

The inflation pressure $p$ of the enclosure 8, that is to say the pressure which exists in this enclosure in the absence of liquid, is lower than the inflation pressure $p'$ of the enclosure 8'; it is also lower than the pressure $P_0$ which exists, when empty, in the cylinder 1; the pressure $p'$ is, for its part, lower than the pressure $P_1$ at which the control valve 10 opens.

When the pressure $P$ in the cylinder 1, which is proportional to the load on the axle, is lower than the pressure $p_1$ the flexibility of the suspension is given by the formula:

$$f = k\frac{pv}{P^2}$$

$v$ being the volume of the enclosure 8. This variation in the flexibility is illustrated in FIGURE 2 by the curve 15. The damper 7 is so controlled as to correctly operate for these values of the pressure, that is to say, of the load.

When the pressure in the cylinder 1 is above that of the pressure $P_1$ the control valve 10 is open and the flexibility of the suspension is then given by the formula:

$$f = kv\frac{p+p'}{P^2}$$

assuming that the enclosures 8 and 8' have the same volume. The variation in the flexibility is thus illustrated in FIGURE 2 by the curve 16. For corresponding load, the variation of the load gives rise to a modification in the volume of liquid, which is larger in the enclosure 8' than in the enclosure 8, in such a manner that the action of the damper 7' is predominant. This damper is controlled to function correctly at high loads.

It will be appreciated from the above description that the value of the flexibility when the vehicle is empty, for given volume of the enclosure 8, larger than if the enclosure 8' did not exist. It is possible to obtain same flexibility when enty by means of a single enclosure by increasing the volume of this enclosure. However, it is possible that this will be too large and it should be noted, in effect, that because the pressure $p'$ is larger than the pressure $p$, the volume of this single enclosure would be larger than the volumes of the two enclosures 8 and 8'.

When the pressure in the cylinder 1 has reached a value approaching $P_1$, the variation in the flexibility as a function of the load gives rise to a discontinuty. However, the latter is unimportant since it is in practice suppressed by the damping; moreover, the opening and the closure of the valve 9 take place progressively.

It will be clear that the invention should not be considered limited to the embodiments described and it covers moreover, all modifications.

I claim:
1. In a hydro-pneumatic vehicle suspension,
   a liquid-containing cylinder for connection to one member of a vehicle,
   a piston slidable in said cylinder for connection to another member of a vehicle said one member being movable relatively to the other member,
   a first gas-containing chamber communicating with the cylinder,
   a movable separator interposed between the liquid in the cylinder and the gas in the chamber,
   a second gas-containing chamber, and means for placing the cylinder in communication with the second chamber above a predetermined load on the vehicle whereby the resiliency of the suspension can be modified.

2. In a hydro-pneumatic vehicle suspension, a liquid-containing cylinder for rigid connection to one part of the vehicle, a piston slidable on the cylinder for rigid connection to another part of the vehicle, said parts being movable relatively to one another, a first, low-load, pressurized gas-containing enclosure, first separator means in the enclosure face of which comprises the pressurized-gas, first communication means between the cylinder and the enclosure at the other face of the separator means, a second, high-load, pressurized gas-containing enclosure, second separator means in the second enclosure one face of which confines the pressurized-gas, second communication means between the cylinder and the second enclosure at the other face of the second separator means, and valve means interposed in the second communications means operable to provide communication between the cylinder and the second enclosure whenever the vehicle is operating with a high-load.

3. In a hydro-pneumatic suspension, a hydraulic cylinder for connection to one part of a vehicle, a piston movable in said cylinder for connection to another part of the vehicle, a first pressurized-gas container, a first movable wall member on the first container and confining the gas in one portion thereof, first communication means between the container and the cylinder, a second pressurized-gas container, a second movable wall member in the second container, second communication means between the hydraulic cylinder and the second container means, and a valve interposed in said second communication means, said valve being sensitive to the pressure in the hydraulic cylinder and permitting the establishment of communication between the cylinder and second container only at pressure above a predetermined value.

4. A suspension according to claim 1, comprising a first damping device interposed between the cylinder and the first chamber and a second damping device interposed between the cylinder and the second chamber.

5. A suspension according to claim 4 wherein the effects of the first and second damping devices are different.

6. A suspension according to claim 1, wherein the means for placing the cylinder in communication with the second chamber comprises a valve including a valve body having a bore therein and a lateral opening from the bore communicating with the second chamber, a piston slidable in the bore in response to pressure variation in the cylinder, and a spring biassing the piston to close the lateral opening, a predetermined load on the vehicle causing the liquid pressure in the cylinder to rise to a level at which the spring bias is overcome to uncover the said lateral opening.

No references cited.

ARTHUR L. LA POINT, *Primary Examiner.*

R. M. WOHLFARTH, *Assistant Examiner.*